United States Patent
Dent

(10) Patent No.: US 10,845,984 B2
(45) Date of Patent: Nov. 24, 2020

(54) SYSTEM AND A METHOD FOR SENDING A TOUCH MESSAGE

(71) Applicant: Touchgram PTY LTD, West Leederville (AU)

(72) Inventor: Andrew Dent, West Leederville (AU)

(73) Assignee: Touchgram PTY LTD, West Leederville (AU)

( * ) Notice: Subject to any disclaimer, the term of this patent is extended or adjusted under 35 U.S.C. 154(b) by 0 days.

(21) Appl. No.: 15/504,950

(22) PCT Filed: Aug. 20, 2015

(86) PCT No.: PCT/AU2015/050480
§ 371 (c)(1),
(2) Date: Feb. 17, 2017

(87) PCT Pub. No.: WO2016/026006
PCT Pub. Date: Feb. 25, 2016

(65) Prior Publication Data
US 2017/0277384 A1 Sep. 28, 2017

(30) Foreign Application Priority Data
Aug. 20, 2014 (AU) .............................. 2014903278

(51) Int. Cl.
*G06F 3/0488* (2013.01)
*G06F 3/041* (2006.01)
(Continued)

(52) U.S. Cl.
CPC .......... *G06F 3/0488* (2013.01); *G06F 3/0416* (2013.01); *G06F 3/04883* (2013.01);
(Continued)

(58) Field of Classification Search
CPC .. G06F 3/0488; G06F 3/0416; G06F 3/04883; G06F 3/0486; G06F 3/0482; G06F 3/03547; G06F 3/04842; H04L 51/10
(Continued)

(56) References Cited

U.S. PATENT DOCUMENTS 5,801,700 A * 9/1998 Ferguson .............. G06F 3/0486
715/748
6,522,354 B1 * 2/2003 Kawamura ........ H04N 1/00302
348/231.2
(Continued)

FOREIGN PATENT DOCUMENTS

| CN | 102160366 A | 8/2011 |
|---|---|---|
| CN | 103257783 A | 8/2013 |

(Continued)

OTHER PUBLICATIONS

International Search Report dated Dec. 15, 2015, in International Application No. PCT/AU2015/050480.
(Continued)

*Primary Examiner* — Fred Tzeng
(74) *Attorney, Agent, or Firm* — Kim IP Law Group PLLC

(57) ABSTRACT

A method of sending a touch message comprises recording a touch area on a touch receiving surface of a first device; recording a response to be triggered upon touch of a touch receiving surface within the touch area; forming a message comprising the recorded touch area and the response; transmitting the message from the first device to a second device; receiving a touch on a touch receiving surface of the second device; and checking that the touch is within the touch area and in that event triggering the response.

32 Claims, 5 Drawing Sheets

(51) Int. Cl.
*H04L 12/58* (2006.01)
*G06F 3/16* (2006.01)

(52) U.S. Cl.
CPC ............. *H04L 51/10* (2013.01); *G06F 3/167* (2013.01); *G06F 2203/04808* (2013.01)

(58) Field of Classification Search
USPC ........................................................ 345/173
See application file for complete search history.

(56) References Cited

U.S. PATENT DOCUMENTS

| | | | |
|---|---|---|---|
| 6,683,649 B1 | 1/2004 | Anderson | |
| 7,844,914 B2* | 11/2010 | Andre | G06F 3/04883 |
| | | | 715/773 |
| 8,255,830 B2* | 8/2012 | Ording | H04M 1/72552 |
| | | | 715/810 |
| 8,344,862 B1 | 1/2013 | Donham | |
| 10,146,422 B2* | 12/2018 | Guehring | G06F 3/04842 |
| 2009/0037536 A1* | 2/2009 | Braam | H04L 67/2861 |
| | | | 709/206 |
| 2009/0049502 A1* | 2/2009 | Levien | H04N 21/4788 |
| | | | 725/136 |
| 2010/0013653 A1 | 1/2010 | Birnbaum et al. | |
| 2010/0124906 A1* | 5/2010 | Hautala | G06Q 10/10 |
| | | | 455/412.1 |
| 2011/0221694 A1 | 9/2011 | Karaoguz et al. | |
| 2012/0131458 A1* | 5/2012 | Hayes | H04W 4/21 |
| | | | 715/716 |
| 2012/0196630 A1 | 8/2012 | Kawalkar | |
| 2013/0038554 A1 | 2/2013 | West | |
| 2013/0212470 A1* | 8/2013 | Karunamuni | G06F 40/166 |
| | | | 715/243 |
| 2013/0322651 A1 | 12/2013 | Cheever et al. | |
| 2013/0332837 A1 | 12/2013 | Jarvinen et al. | |
| 2014/0055552 A1* | 2/2014 | Song | H04L 12/1818 |
| | | | 348/14.02 |
| 2014/0085487 A1* | 3/2014 | Park | H04N 5/23293 |
| | | | 348/207.1 |
| 2014/0136990 A1* | 5/2014 | Gonnen | H04L 51/18 |
| | | | 715/752 |
| 2014/0195943 A1 | 7/2014 | Zheng et al. | |
| 2014/0361982 A1* | 12/2014 | Shaffer | G06F 9/541 |
| | | | 345/156 |
| 2015/0040029 A1* | 2/2015 | Koum | H04W 4/20 |
| | | | 715/748 |
| 2016/0018917 A1* | 1/2016 | Liu | G06F 3/03547 |
| | | | 345/173 |
| 2016/0026381 A1* | 1/2016 | Kim | G06F 1/165 |
| | | | 715/761 |
| 2016/0182707 A1* | 6/2016 | Gabel | G06F 3/0482 |
| | | | 455/404.2 |

FOREIGN PATENT DOCUMENTS

| | | |
|---|---|---|
| CN | 103885708 A | 6/2014 |
| JP | 2013073118 A | 4/2013 |
| JP | 2012520522 A | 4/2015 |
| JP | 2011076549 A | 5/2015 |

OTHER PUBLICATIONS

Written Opinion dated Dec. 15, 2015, in International Application No. PCT/AU2015/050480.
International search report and written opinion dated Dec. 15, 2015, International application No. PCT/AU2015/050480.
International—Type Search Report dated Jul. 7, 2015 in Australian Application No. 2014903228.
Office Action dated Aug. 28, 2018 in Japanese Application No. 2017-510589.
Office Action dated Sep. 25, 2019 in Chinese Application No. 20140802.
Outlook Tips: Manually Send and Receive in Outlook, May 20, 2014 (May 20, 2014), XP055455483, https://www.outlook-tips.net/tips/manually-send-receive-outlook/.
Anonymous: "Surface Pro 3—Wikipedia", Jul. 24, 2014 (Jul. 24, 2014), XP055455484, https://en.wikipedia.org/w/index.php?title=Surface Pro 3&oldid=618272063.

* cited by examiner

SYSTEM AND A METHOD FOR SENDING A TOUCH MESSAGE

CROSS-REFERENCE TO RELATED APPLICATION

This application is a national phase application under 35 U.S.C. § 371 of International Patent Application No. PCT/AU2015/050480 filed 20 Aug. 2015, which claims foreign priority to Australian patent application no. 2014903278 filed 20 Aug. 2014, the entire disclosures of which are hereby incorporated by reference herein in their entirety.

FIELD OF THE INVENTION

The present invention relates to a system and a method for sending a touch message, including but not limited to an interactive electronic message.

BACKGROUND

People separated by long distances are capable of communicating and interacting with each other using portable computer devices such as "smart phones". These portable computer devices are capable of composing and transmitting electronic messages between other similar devices using a wireless data network. These messages may be in the form of brief text message or multimedia messages that may include image, video and sound content. Interaction using electronic messages is typically limited to reading text, viewing a video clip or listening to a sound clip.

In most instances, these messages are only sufficient for relaying a message using the two senses of sight and hearing.

The present invention seeks to overcome, or at least substantially ameliorate, the disadvantages and/or shortcomings of the background art, and/or to provide an alternative.

Any references to documents that are made in this specification are not intended to be an admission that the information contained in those documents form part of the common general knowledge known to a person skilled in the field of the invention, unless explicitly stated as such.

SUMMARY OF THE INVENTION

According to the present invention there is provided a method of sending a touch message comprising:
recording at least one touch area on a touch receiving surface of a first device;
recording a response to be triggered upon touch of a touch receiving surface within the touch area;
forming a message comprising the recorded touch area and the response;
transmitting the message from the first device to a second device;
receiving a touch on a touch receiving surface of the second device;
checking that the touch is within the touch area and in that event triggering the response.

According to the present invention there is provided a method of sending a touch message comprising:
recording a touch area on a touch receiving surface of a first device;
recording a response to be triggered upon touch of a touch receiving surface within the touch area;
forming a message comprising the recorded touch area and the response;
transmitting the message from the first device to a second device so that when a touch
receiving surface of the second device receives a touch, the touch can be compared to the touch area and when the touch is within the touch area the response can be triggered.

According to the present invention there is provided a method of receiving a touch message on a second device comprising:
receiving a message comprising a recorded touch area on a touch receiving surface of a first device and a response to be triggered upon touch of a touch receiving surface within the touch area;
receiving a touch on a touch receiving surface of the second device;
checking that the touch is within the touch area and in that event triggering the response.

In an embodiment the touch receiving surface is a touch screen.

In an embodiment an image is selected for inclusion in the message, so as to provide a visual reference for the touch of the touch receiving surface.

In an embodiment the visual reference is used in generating the touch area.

In an embodiment the touch area is generated by a user of the first device touching the touch receiving surface and recording the touch of the touch receiving surface.

In an embodiment the visual reference is used in receiving the touch on the second device.

In an embodiment a series of visual references are used in generating a series of touch areas.

In an embodiment each visual reference in the series of visual references undergoes a transition to another visual reference.

In an embodiment the transition from one visual reference to another visual reference has an associated auditory and or visual effect.

In an embodiment the touch area is the entire touch screen.

In an embodiment the touch area is a portion of the touch screen.

In an embodiment the touch area is a plurality of portions of the touch screen.

In an embodiment the touch area further comprises sequential touch of the plurality of the portions.

In an embodiment the touch area further comprises a timing of touch of the plurality of the portions.

In an embodiment the touch area further comprises a touch and drag movement of one portion to another portion.

In an embodiment the touch area further comprises a series of touch and drag movements of one portion to another portion.

In an embodiment the image is obtained from a camera of the device or a storage of the device.

In an embodiment the touch area is signified to a user of the second device.

In an embodiment the touch area is visually highlighted on the touch screen.

In an embodiment a visual prompt is displayed on the touch screen for guiding the user of the second device where to touch and in some embodiment when and/or in what order to touch.

In an embodiment the response is to display a first image and or to play a first sound.

In an embodiment the sound is obtained from a microphone of the device or the storage of the device.

In an embodiment the second device may be configured to indicate that the user of the second device is incorrectly touching the touch area of the touch screen.

In an embodiment the indication may be to display a second image or to play a second sound.

In an embodiment the second device is configured to compare the accuracy of the touch on the second device to the touch area.

In an embodiment a degree of correspondence between the touch on the first device and on the second device is determined.

In an embodiment the second device may progressively indicate the degree of correspondence between the touch on the first device and on the second device.

In an embodiment more than one response may be recorded, wherein a first response may be triggered when the degree of correspondence is at or above a predefined amount and a second response may be triggered when the degree of correspondence is below the predefined amount.

In an embodiment the receipt of touch of the second device, indication of the degree of correspondence and response may be automatically repeated.

In an embodiment the touch area is scaled according to the size of the touch screen on the first device and the size of the touch screen on the second device.

In an embodiment the touch area may be defined to be within a screen aspect ratio.

In an embodiment another image is selected for inclusion in the message, so as to provide a background.

In an embodiment the background may comprise of more than one image.

In an embodiment the touch message may be stored on the first device as a template, wherein elements of the touch message defined by the previous statements may be altered.

According to the present invention there is provided a system for sending a touch message comprising:

a first device and a second device;

the first device comprising a touch receiving surface, a recorder of a touch area on the touch receiver, a recorder of a response to be triggered upon touch of a touch receiving surface within the touch area, a message former for forming a message comprising the recorded touch area and the response, and a transmitter of the message from the first device to the second device;

the second device comprising a touch receiving surface for receiving a touch and a checker for checking that the touch is within the touch area and in that event triggering the response.

According to the present invention there is provided a first device configured to send a touch message to a second device, the first device comprising:

a touch receiving surface, a recorder of a touch area on the touch receiving surface, a recorder of a response to be triggered upon touch of a touch screen within the touch area, a message former for forming a message comprising the recorded touch area and the response, and a transmitter of the message from the first device to the second device, wherein the message is configured so that when a touch receiving surface of the second device receives a touch, the touch can be compared to the touch area and when the touch is within the touch area the response can be triggered.

According to the present invention there is provided a second device configured to receive a touch message from a first device comprising:

a receiver of a message comprising a recorded touch area on a touch receiving surface of a first device and a response to be triggered upon touch of a touch receiving surface within the touch area;

a touch receiving surface for receiving a touch;

a checker for checking that the touch is within the touch area and in that even triggering the response.

In an embodiment the first and second devices may be smart phones (or other portable computing devices) configured with a computer application stored in non-transient memory comprising instructions for controlling the respective smart phone to operate as defined above.

According to the present invention there is provided a computer program product stored in a tangible form comprising instructions for controlling a processor of a portable computing device to do one or both of A and B:

Where A) is:

record a touch area on a touch receiving surface of a first device;

record a response to be triggered upon touch of a touch receiving surface within the touch area;

form a message comprising the recorded touch area and the response; transmit the message from the first device to a second device so that when a touch receiving surface of the second device receives a touch, the touch can be compared to the touch area and when the touch is within the touch area the response can be triggered; or Where B) is:

receive a message comprising a recorded touch area on a touch receiving surface of a first device and a response to be triggered upon touch of a touch receive surface within the touch area;

receive a touch on a touch receiving surface of the second device; check that the touch is within the touch area and in that event triggering the response.

According to the present invention there is provided a method comprising transmitting, receiving or storing the above computer program product.

According to the present invention there is provided a message in the form of computer readable data, wherein the comprises: a recorded touch area on a touch receiving surface of a first device and a response to be triggered upon touch of a touch receiving surface of a second device within the touch area.

According to the present invention there is provided a method comprising transmitting, receiving or storing the above message.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DESCRIPTION OF DRAWINGS

In order to provide a better understanding of the present invention embodiments will now be described may be described, by way of example only, with reference to the drawings, in which.

DETAILED DESCRIPTION

Figure 1:
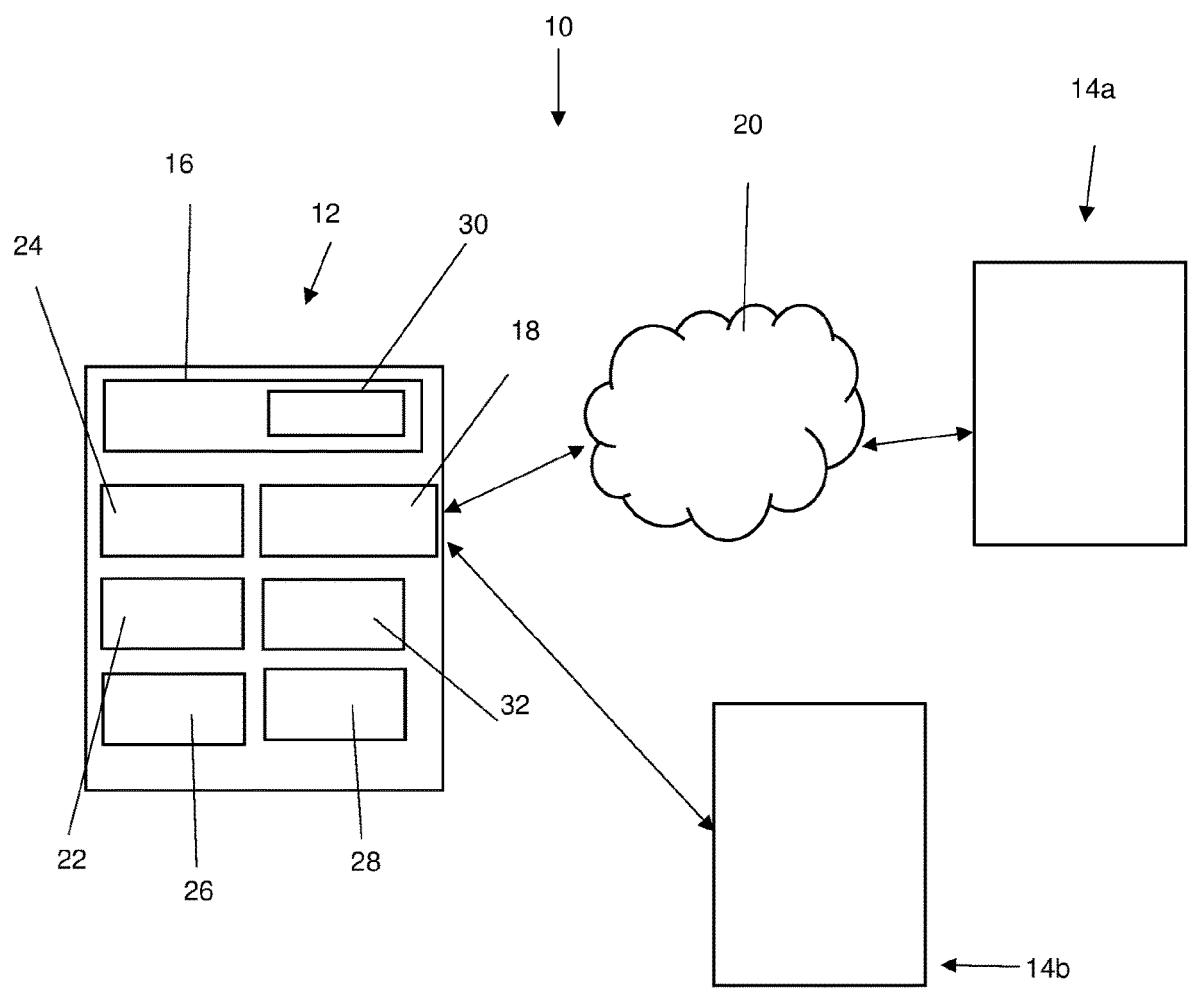
FIG. 1 illustrates a system embodying the present invention.

FIG. 1 shows a system 10 for sending a touch message, within which the present invention may be embodied. The system 10 comprises a first device 12 and a second device 14a, 14b. As will be apparent, each of the devices 12, 14a, and 14b can be a smart phone, a laptop computer, a tablet computer, or the like.

The first device 12 comprises memory 16 comprising a volatile memory such as random access memory (RAM) and non-volatile memory, such as read only memory (ROM).

The first device 12 also comprises a network interface 18 for communicating with one or more networks 20. The network 20 may be wired, such as an Ethernet network, or wireless, such as a Bluetooth network, an IEEE 802.11 network or a mobile telephone network. The network 20 may be a local area network (LAN), such as a home or office computer network, or a wide area network (WAN), such as the Internet or a private WAN. The network 20 may comprise a message exchange or messages may be sent from one device to another without passing through an exchange.

The first device 12 comprises a processor 22 for executing the instructions that comprise a computer application 30. The computer application 30 may be loaded into the memory 16 from storage device 24. The computer program 30 may be obtained from an application store via the network 20 using network interface 18. The storage device 24 may be a SSD, a HDD or similar.

In this manner, the computer application 30 stored in the memory 16, when retrieved and executed by the processor 22, may configure the first device 12 as a special purpose machine that may comprise the functional modules and or may perform the functions described herein.

The device 12 will also have a touch screen 32 for display of images to a user and for receiving input from the user. Typically the device will also comprise a camera 28 and a microphone/speaker 26. The second device 14a, 14b will typically have the same hardware components as device 12, or substantially equivalent, along with the computer application 30 loaded into its member for execution by its processor.

Figure 2:
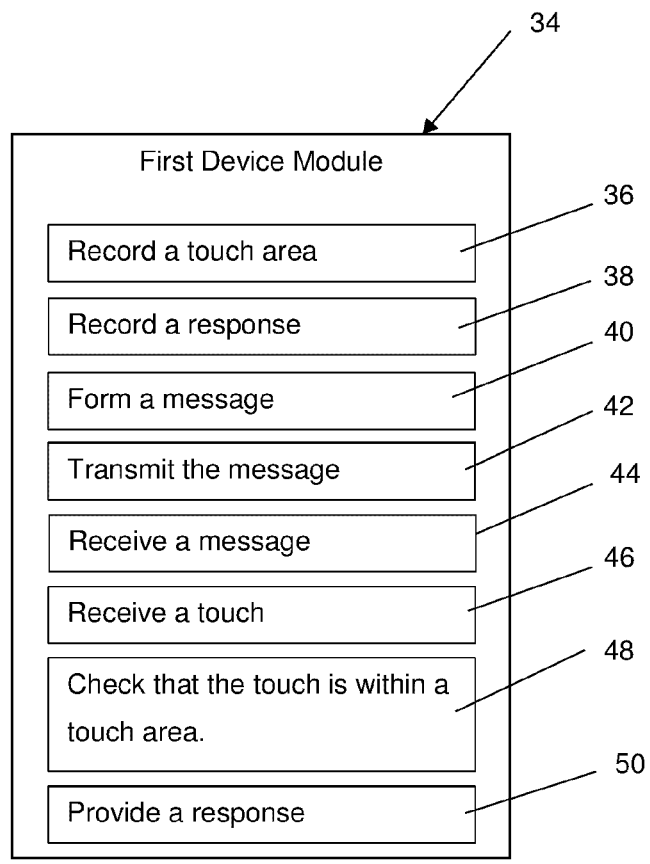
FIG. 2 is a block diagram of functional modules of a first device according to an embodiment of the present invention.

Referring to FIG. 2, in an embodiment the first device 12 is configured by the instructions of the computer application 30 to operate with the following functional modules 34:
 a module 36 for recording a touch area;
 a module 38 for recording a response;
 a module 40 for forming a message;
 a module 42 for transmitting the message;
 a module 44 for receiving a message;
 a module 46 for receiving a touch;
 a module 48 for checking that the touch is within a touch area;
 a module 50 for providing a response.

The module 36 records a touch area by receiving a touch input to a touch receiving surface of the touch screen 32 and records the positional information of touch on the touch screen 30 so that a touch area is defined. The positional information defines the touch area and is recorded in the storage device 24 (or memory 16). The touch screen 32 may display a selected image so as to form a visual reference for the user to touch.

The module 38 records a response by receiving a user input that selects a type of response and in some cases makes a recording of the response, such as by recording a sound from the microphone 26, an image form the camera 28 or a video from the microphone 26 and the camera 28. In some instances a pre-recorded response is selected.

The module 40 forms a message by receiving a destination identifier from the user. The module 40 also formats the recorded touch area, preferably the reference image, and the recorded response into a format suitable to be sent as a message. The message is stored in the storage device 24 (or memory 16). The message is configured so that when a touch receiving surface of the second device 14a, 14b receives a touch, the touch can be compared to the touch area and when the touch is within the touch area the response can be triggered.

The module 42 transmits the message by uploading to message to the designation via the network interface 18. The message is then transmitted through the network interface 18 to the second device 14a via the network 20 to a cloud server exchange, or directly to the second device 14b.

Figure 3:
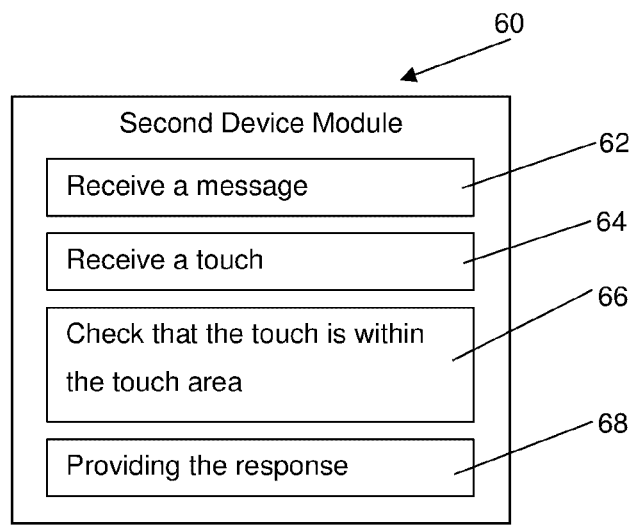
FIG. 3 is a block diagram of functional modules of a second device according to an embodiment of the present invention.

Referring to FIG. 3, in an embodiment the second device 14a, 14b is configured by the instructions of the computer application, which may be provided loaded onto the second devices 14a, 14b via the network 20, to operate with the following functional modules 60:
 a module 62 for receiving a message;
 a module 64 for receiving a touch;
 a module 66 for checking that the touch is within a touch area;
 a module 68 for providing the response.

It will be appreciated that the first device may be configured to receive a message or use the message created by the user and operate the same as the second device. Thus module 44 operates the same as module 62. Module 46 operates the same as module 64. Module 48 operates the same as module 66. Module 50 operates the same as module 68. The operation will be described with reference to the modules of the second device, but it will be appreciated that the operation can be conducted on the first device with its corresponding modules.

Module 62 receives message via a network interface 18 of the second device 14a, 14b. The message, as noted above, comprises a recorded touch area on a touch receiving surface (touch screen 32) of the first device 12 and a response to be triggered upon touch of a touch receiving surface (touch screen 32) of the second device 14a, 14b within the touch area. The message may also comprise a reference image to be displayed on the touch screen 32 of the second device 14a, 14b.

When there is a reference image, it is displayed on the touch screen 32. Module 64 receives a touch input on the touch screen 32 of the second device 14a, 14b. The touch input is recoded in the storage device 24 (or memory 16) for comparison.

Module 66 makes the comparison and checks that the touch input is within the touch area. Depending on the configuration various degrees of accuracy are permitted. In the event that the touch input matches (within the permitted accuracy) the received touch area a response is triggered.

Module 68 provides the triggered response according to the response in the received message. For instance the response could be a sound, an image or a video that is output to the screen 32 and or speaker 26 of the second device, as appropriate.

According to the system 10, the second device 14*a* receives the message via the network 20 while the second device 14*b* receives the message directly from the first device 12. Both second devices 14*a* and 14*b* receive the message using a receiver in the form of a network interface. Once the message is received the process is the same as that of when the first device 12 acts as the second device.

Touch messages are sent between computing devices, usually smartphones. They combine a recording of touches with optional sound and images. The touches can be used to define alternative behaviour on playback of the response. Playback of the response might be: 1. on the same device; or 2. on another device within a short-range, possibly Bluetooth range; or 3. on a more distant device after sending a message via a message exchange hub.

Figure 4:
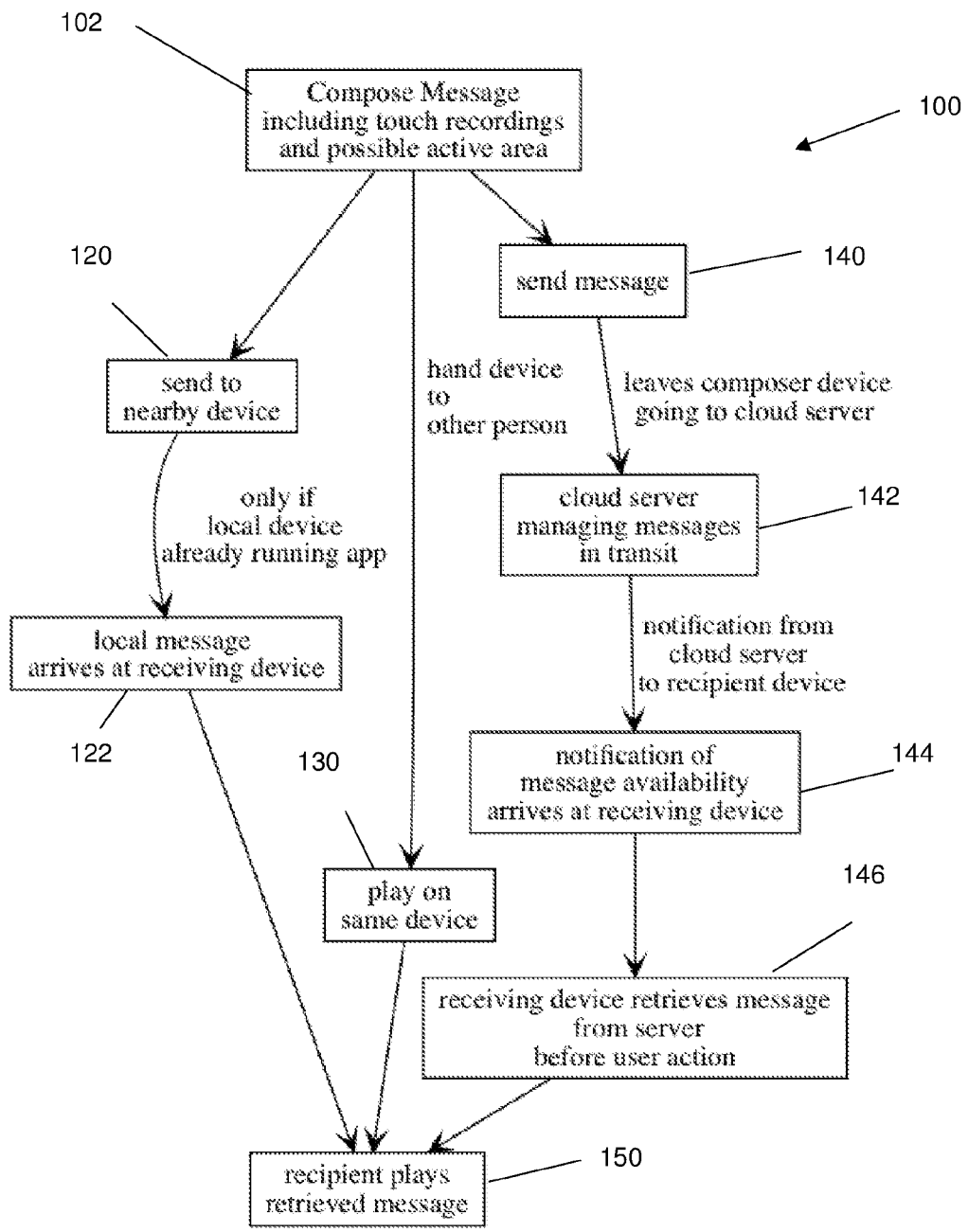
FIG. 4 is a flowchart illustrating a method of sending a touch message.

Referring to FIG. 4, a method 100 for sending a touch message is shown. Starting at 102, the user of the first device 12 composes the touch message ready for sending. This is described in more detail below in reference to FIG. 5.

There are at least three possibilities at this point. The first is to send the message to a local device in which a receiving application is running. The application running on the first device 12 may be able to recognise that the application is running on the second device 14*b*, connected via a LAN. A connection is established between two devices running the application. One device broadcasts a signal and a second device indicates that it is present. Either device can then initiate sending a message. The broadcast may be for example a UDP message broadcast on the LAN. In this case the message is sent to the local device 120. The local message arrives at the receiver second device 14*b* via a transmission over the LAN.

The second possibility is that the user hands the device to another person. The other person is able to select 130 to play the message on the same device.

The third possibility is that the destination device 14*a* is either not local or is not currently on-line. In this case a connection is established with a message coordination hub, also referred to as an exchange that coordinates the transfer of messages. The message is sent 140 to the exchange. The exchange receives the message 142, and sends a notification to the recipient device identified in the message when it is on-line. It may poll the recipient device or the exchange server may be checked when the recipient device connects to the Internet or when the application is started on the recipient device. A notification of the message being available is sent to and arrives at the receiving device 14*a* at 144. The device 14*a* retrieves the message from the exchange server 146.

The ability to transfer a touch message may be open, only requiring an address of the recipient device, such as a telephone number, email address, IP address or similar. Alternatively a prior permission may be required between devices for touch messages to be transferred.

The user is then able to activate the message at 150. The recipient user can be prompted to start touching the message. The prompting options are specified when the message is composed—they are a choice of the sender, not the receiver of the message.

When a message is received, prompting actions include:
1. No prompting, or
2. entire active area flashes slightly, or
3. a pulsing shape appears where the user should start touching, and moves slightly to lead their finger along the path they should touch or trace.

The receiving device 14*a*, 14*b* responds to the user actions of touching the screen by any combination of the following actions, depending on what was specified during message composition:
1. No visible response.
2. Recording a "score" based on the accuracy of the touch matching the original touch.
3. Providing a continual visual highlight as the finger traces, with the highlight varying depending on the correspondence to the original touch.
4. Providing audio feedback regularly or continually during the touching, varying according to the correspondence to the original touch
5. On detecting the cessation of touch, either by accurately completing the original touch pattern or a pre-determined pause with no touching, providing final feedback which may vary according to how accurately the original touch pattern was followed, which may include one or more of:
   a. Audio feedback,
   b. Image feedback.
   c. A textual message.

Figure 5:
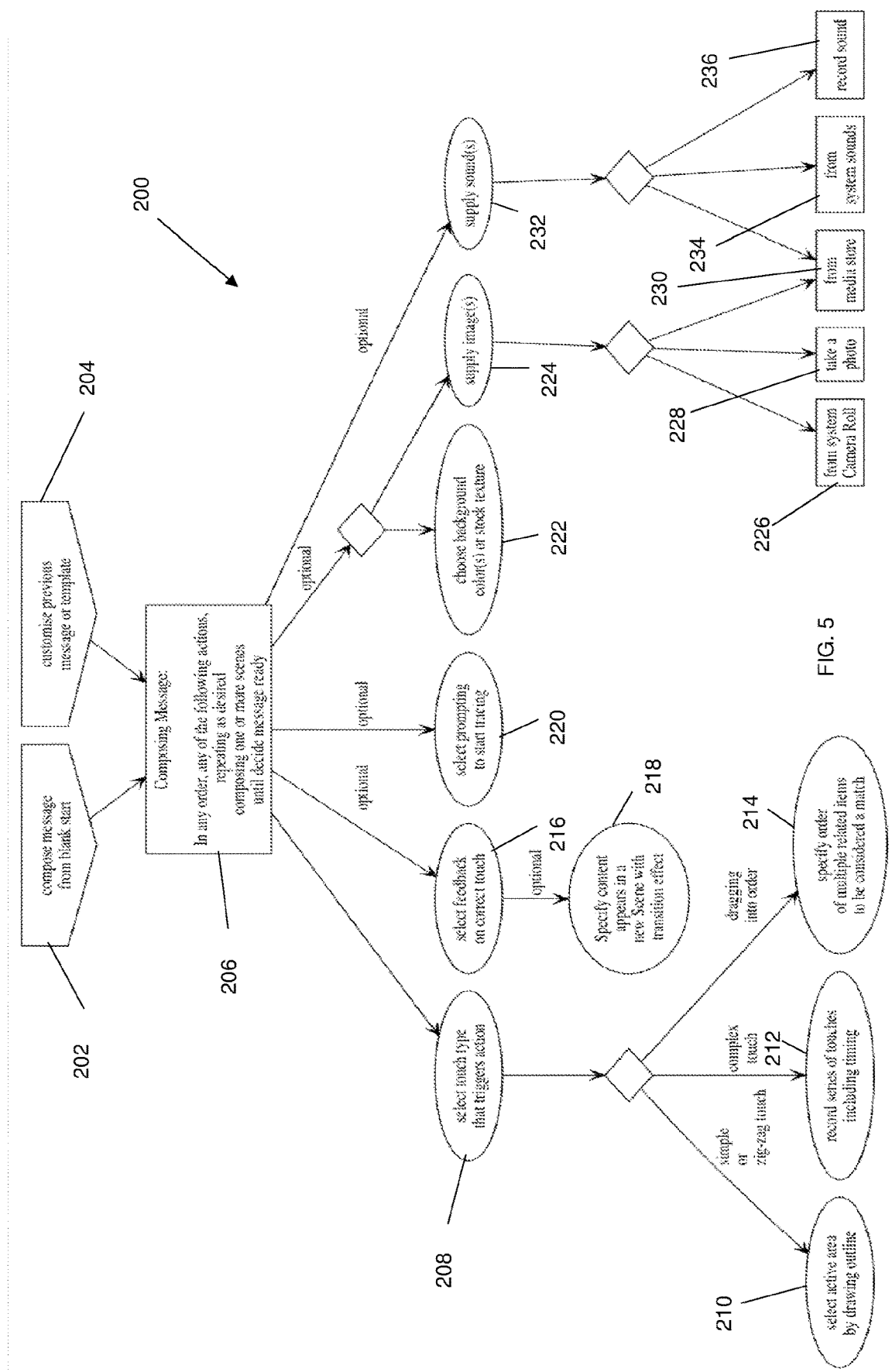
FIG. 5 is a flowchart illustrating a method of composing a touch message.

Referring to FIG. 5, a method 200 for composing a touch message is shown. The user can either commence composing a message from a blank start 202 for from a previous message or from a template 204.

The message is then "opened" for composing at 206, where the user can compose one or more scenes until the message is ready. The user must select a trigger area at 208, which can be one a number of different touch types. The user must provide a message to be triggered. Usually, and often firstly, a reference background is chosen 222/224. In the case of 224, the reference background is an image. The image can be from the camera 228, a saved picture on the device 226 or content from a media store 230. In the case of 222, if no graphical background for the touch pattern is specified, a default solid colour is chosen by the application.

The reference background provides a visual reference for the user the touch. The touch area is then defined according to the selected touch type. In a simple case this involves setting up one or more touches so an action may be performed in reaction to touching the touch area. It is mandatory to at least define some touch mechanism. The touch applied to the touch screen of the first device becomes the touch area and is recorded in a touch record mode. This will become a triggering mechanism for the touch message when it is received. The triggering mechanisms for providing the message can be:
1. Any touch within a specified area, or the entire picture, i.e. a simple touch, or a "zig-zag" back and forth touch within a specified area or the whole picture or by drawing an outline 210, or
2. A complex series of touches 212, possibly with timing activated.
3. A specific order of multiple touches 214.

Optionally feedback may be selected on a correct/incorrect touch 216. The content to be provided in this case is selected 218, which can include a new scene with a transition effect. The new scene may have a different touch action required to activate the response.

Optionally prompting to start tracing (touching) can be selected 220.

The triggered response is then defined by selecting an optional new image 224 from a photo taken 228, from the device 226 or from a media store 230. Optionally a sound may be supplied 232, system sounds on the device 234, from a recorded sound 236 or from a media store 230. The response could also be a video.

Figure 6:
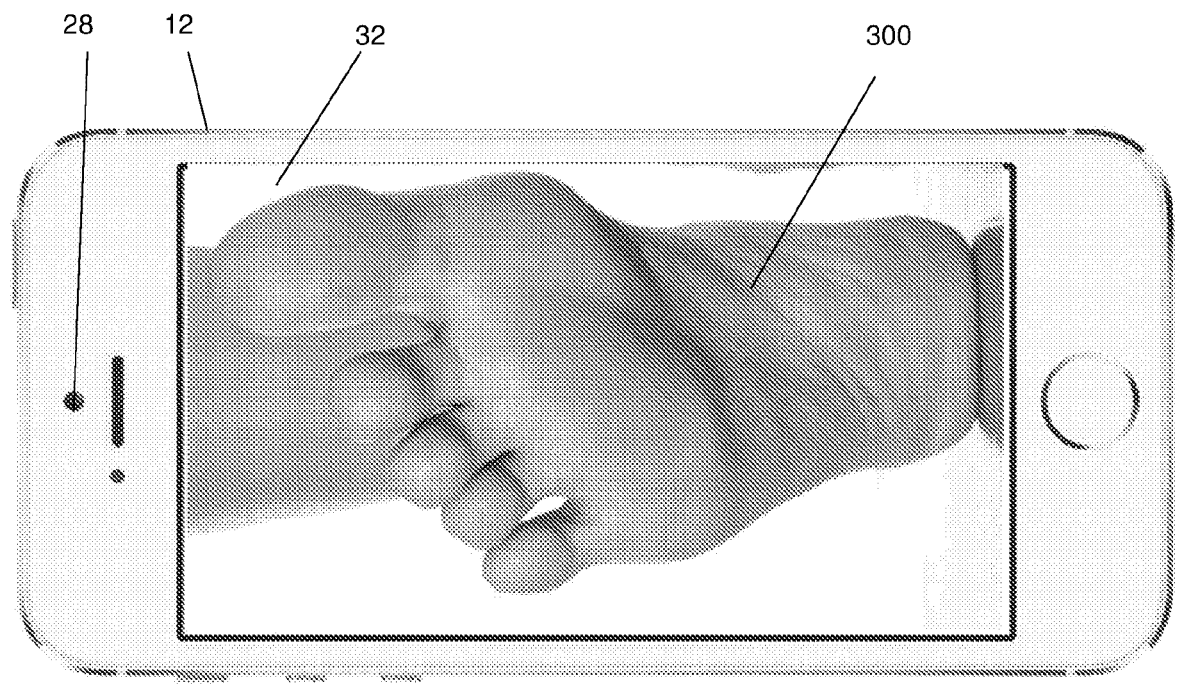
FIG. 6 is a device having a visual reference displayed on a touch receiving surface.
Figure 7:
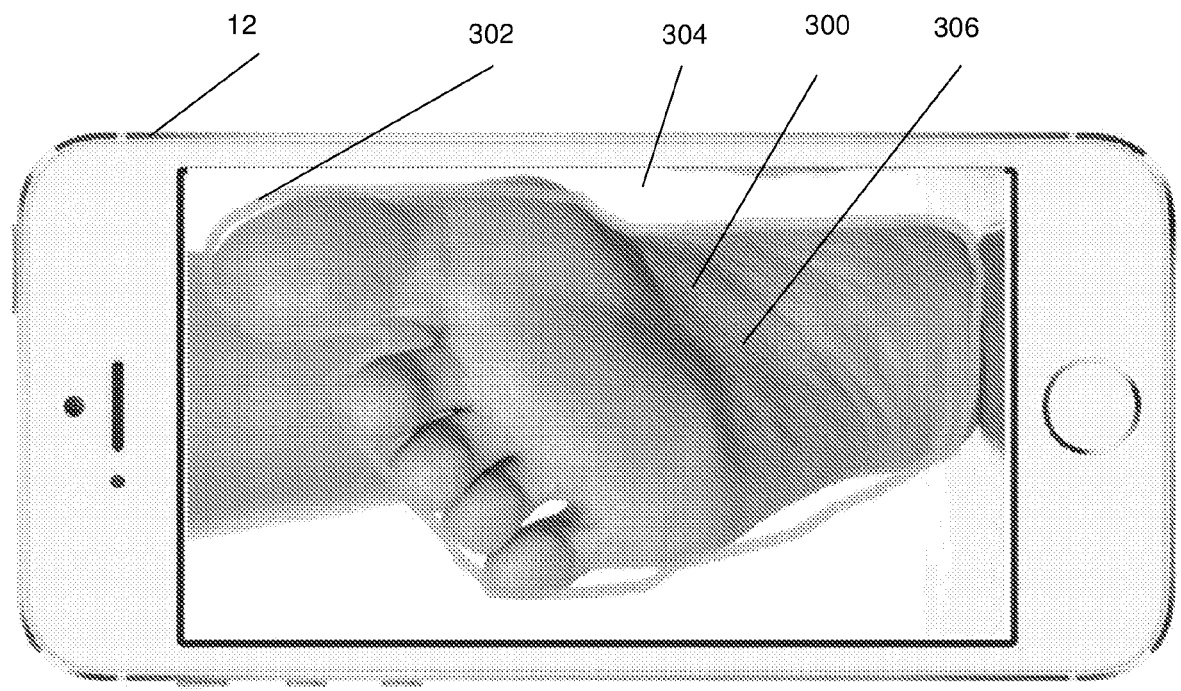
FIG. 7 is the device of FIG. 6 having a touch area defined on the visual reference.

An example touch message is described below with reference to FIGS. 6 and 7. The camera 28 is used to take photograph of a foot 300, which is displayed on the touch screen 32. An active touch area 306 is specified by drawing over the picture 300, that is, by touching the reference image 300 on the touch screen 32 to trace 302 by touch the touch area 306. The sound of person giggling is recorded using the microphone 26. The message is sent, or the message is played back on same device which now is termed "receiving device". On receiving device, touching the touch area 306 on the touch screen 32 results in the sound being played. Touching the outside 304 of the touch area may produce no response or an alternative response.

The screen sizes of the touch screens of the first and second devices may be different. Accordingly the reference image and the touch area can be scaled according to the ration of the size of the touch screen on the first device and the size of the touch screen on the second device. Additionally the touch area may be defined to be within a screen aspect ratio so that it is not distorted.

Modifications may be made to the present invention within the context of that described and shown in the drawings. Such modifications are intended to form part of the invention described in this specification.

The invention claimed is:

1. A method of sending a touch message comprising:
recording a first touch area on a first touch-receiving surface of a first device capable of receiving a first touch;
recording a response to be triggered upon a second touch-receiving surface of a second device receiving a correctly positioned touch;
forming a message comprising representations of the recorded first touch area and the response;
transmitting the message from the first device to the second device;
receiving a second touch on the second touch-receiving surface of the second device; and
checking that the second touch is within a second touch area which is applied to the second touch-receiving surface according to the recorded first touch area, and in that event triggering the response.

2. A method according to claim 1, wherein the first touch area is generated by a user performing the first touch by touching the first touch-receiving surface and recording the first touch applied to the first touch-receiving surface.

3. A method according to claim 1, wherein an image is selected for inclusion in the message, so as to provide a visual reference for the first or the second touch of the respective touch-receiving surface.

4. A method according to claim 3, wherein the visual reference is used in receiving the second touch on the second device.

5. A method according to claim 1, wherein a series of images are selected for inclusion in the message, so as to provide a series of visual references for the first or second touch of the respective touch-receiving surface.

6. A method according to claim 5, wherein each of the visual references is used in generating a series of touch areas.

7. A method according to claim 5, wherein each of the visual references is used in receiving the series of second touches on the second device.

8. A method according to claim 7, wherein each visual reference may transition to another visual reference.

9. A method according to claim 8 wherein the transition from one visual reference to another visual reference has an associated auditory and/or visual effect.

10. A method according to claim 1, wherein the first touch area is a plurality of portions of the first touch-receiving surface and the second touch area is a plurality of portions of the second touch-receiving surface.

11. A method according to claim 10, wherein the first and second touch areas each further comprise sequential touches of the respective plurality of the portions of the respective touch-receiving surface.

12. A method according to claim 11, wherein the first and second touch areas each further comprise a timing of each of the respective sequential touches of the plurality of the portions.

13. A method according to claim 11, wherein the first and second touches each further respectively comprise a touch and drag movement of one portion to another portion.

14. A method according to claim 11 wherein the first and second touches each further respectively comprise a series of touch and drag movements of one portion to another portion.

15. A method according to claim 1, wherein the second touch area is signified to a user of the second device.

16. A method according to claim 1, wherein the second touch area is visually highlighted on the second touch-receiving surface.

17. A method according to claim 1, wherein a visual prompt is displayed on the second touch-receiving surface for guiding the user of the second device where to touch and when and/or in what order to touch to create the second touch.

18. A method according to claim 1, wherein the response is to display a first image and/or to play a first sound.

19. A method according to claim 1, wherein the second device is configured to indicate that the user of the second device is incorrectly touching the second touch area applied to the second touch-receiving surface.

20. A method according to claim 1, wherein the second device is configured to compare the accuracy of the second touch on the second device to the second touch area.

21. A method according to claim 1, wherein a degree of correspondence between the first touch on the first device and the second touch on the second device is determined.

22. A method according to claim 21, wherein the second device progressively indicates the degree of correspondence between the first touch on the first device and the second touch on the second device.

23. A method according to claim 21, wherein more than one response is recorded, wherein a first response is triggered when the degree of correspondence is at or above a predefined amount and a second response is triggered when the degree of correspondence is below the predefined amount.

24. A method according to claim 21, wherein the receipt of the second touch of the second device, indication of the degree of correspondence and response is automatically repeated.

25. A method according to claim 1, wherein the second touch area is scaled according to the size of the first touch surface on the first device and the size of the second touch surface on the second device.

26. A method according to claim 1, wherein the first touch area is defined by dimensions within a screen aspect ratio.

27. A method of sending a touch message comprising:
  recording a first touch area on a first touch-receiving surface of a first device capable of receiving a first touch;
  recording a response to be triggered upon a second touch-receiving surface of a second device receiving a correctly positioned touch;
  forming a message comprising representations of the recorded touch area and the response; and
  transmitting the message from the first device to the second device so that when the second touch-receiving surface of the second device receives a second touch, the second touch is compared to a second touch area applied to the second touch-receiving surface according to the transmitted recorded first touch area to determine whether the second touch is applied within the second touch area which is applied to the second touch-receiving surface and when the second touch is within the second touch area the response is triggered.

28. A method of receiving a touch message on a second device comprising:
  receiving a message comprising representations of a recorded first touch area on a first touch-receiving surface of a first device capable of receiving a first touch and a response to be triggered upon a second touch-receiving surface of the second device receiving a correctly positioned touch;
  receiving a second touch on the second touch-receiving surface of the second device;
  checking whether the second touch is within a second touch area which is applied to the second touch-receiving surface according to the received recorded first touch area, and in that event triggering the response.

29. A system for sending a touch message comprising:
  a first device and a second device;
  the first device comprising a first touch-receiving surface capable of receiving a first touch, a recorder capable of recording a first touch area on the first touch-receiving surface, a recorder of a response to be triggered upon a second touch-receiving surface of the second device receiving a correctly positioned touch, a message former for forming a message comprising representations of the recorded first touch area as applied to the first touch-receiving surface and the response, and a transmitter capable of transmitting the message from the first device to the second device;
  the second device comprising the second touch-receiving surface for receiving the second touch and a checker for checking that a second touch is within a second touch area which is applied to the second touch-receiving surface according to the received recorded first touch area, and in that event triggering the response.

30. A first device configured to send a touch message to a second device, the first device comprising:
  a first touch-receiving surface capable of receiving a first touch, a recorder capable of recording a first touch area on the first touch-receiving surface, a recorder of a response to be triggered upon a second touch-receiving surface of the second device receiving a correctly positioned touch, a message former for forming a message comprising representations of the recorded first touch area and the response, and a transmitter capable of transmitting the message from the first device to the second device, wherein the message is configured so that when the second touch-receiving surface of the second device receives a second touch, the second touch is compared to a second touch area applied to the second touch-receiving surface according to the received recorded first touch area, to determine whether the second touch is applied within the second touch area which as applied to the second touch-receiving surface and when the second touch is applied within the second touch area the response is triggered.

31. A second device configured to receive a touch message from a first device comprising:
  a second touch-receiving surface for receiving a second touch;
  a receiver capable of receiving a message comprising representations of a recorded first touch area on a first touch-receiving surface of a first device capable of receiving a first touch and a response to be triggered upon the second touch-receiving surface receiving a correctly positioned touch; and
  a checker for checking whether the second touch is within the second touch area applied to the second touch-receiving surface according to the received recorded first touch area, and in that event triggering the response.

32. A computer program product stored in a tangible form comprising instructions for controlling a processor of a portable computing device to do one or both of A and B:
  Where A) is:
    record a first touch area on a first touch-receiving surface of the portable computing device a first device capable of receiving a first touch;
    record a first response to be triggered upon a second touch-receiving surface of a second device receiving a correctly positioned touch;
    form a first message comprising representations of the recorded first touch area and the response;
    transmit the message from the first device to the second device so that when the second touch-receiving surface of the second device receives the second touch, the second touch is checked to determine whether the second touch is within a second touch area applied to the second touch-receiving surface according to the received recorded first touch area, and in that event the response is triggered; or
  Where B) is:
    receive a second message comprising representations of a recorded third touch area on a third touch-receiving surface of a third device and a second response to be triggered upon the first touch-receiving surface receiving another correctly positioned touch;
    receive a fourth touch on the first touch-receiving surface;
    check that the fourth touch is within a fourth touch area applied to the first touch-receiving surface according to the received recorded third touch area, and in that event triggering the second response.

* * * * *